US010555334B2

(12) United States Patent
Yamazaki et al.

(10) Patent No.: US 10,555,334 B2
(45) Date of Patent: Feb. 4, 2020

(54) RADIO TERMINAL, BASE STATION, AND PROCESSOR

(71) Applicant: KYOCERA CORPORATION, Kyoto (JP)

(72) Inventors: Chiharu Yamazaki, Tokyo (JP); Masato Fujishiro, Yokohama (JP); Kugo Morita, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 204 days.

(21) Appl. No.: 15/567,930

(22) PCT Filed: Apr. 27, 2016

(86) PCT No.: PCT/JP2016/063255
§ 371 (c)(1),
(2) Date: Oct. 19, 2017

(87) PCT Pub. No.: WO2016/175256
PCT Pub. Date: Nov. 3, 2016

(65) Prior Publication Data
US 2018/0152961 A1    May 31, 2018

(30) Foreign Application Priority Data

Apr. 27, 2015    (JP) ................................. 2015-090516

(51) Int. Cl.
*H04W 72/12*    (2009.01)
*H04L 1/18*    (2006.01)
(Continued)

(52) U.S. Cl.
CPC ....... *H04W 72/1284* (2013.01); *H04L 1/1812* (2013.01); *H04L 1/1854* (2013.01);
(Continued)

(58) Field of Classification Search
None
See application file for complete search history.

(56) References Cited

U.S. PATENT DOCUMENTS

2009/0219897 A1*  9/2009  Pajukoski ............ H04L 1/1671
                                                        370/336
2010/0150092 A1   6/2010  Aydin et al.
(Continued)

FOREIGN PATENT DOCUMENTS

JP    2012-050133 A    3/2012
JP    2012-512588 A    5/2012

OTHER PUBLICATIONS

International Search Report issued in PCT/JP2016/063255; dated Jul. 19, 2016.
(Continued)

*Primary Examiner* — Gregory B Sefcheck
*Assistant Examiner* — Jenkey Van
(74) *Attorney, Agent, or Firm* — Studebaker & Brackett PC (57) ABSTRACT

A UE configured to transmit, to an eNB 200, scheduling requests for requesting a PUSCH resource, by using a PUCCH resource, transmits, among the scheduling requests, a second scheduling request different from a first scheduling request. As the PUCCH resource for the transmission of the second scheduling request, a periodic PUCCH resource is configured. As the PUCCH resource for the transmission of the second scheduling request, an aperiodic PUCCH resource is configured.

12 Claims, 8 Drawing Sheets

(51) Int. Cl.
*H04W 28/02* (2009.01)
*H04L 1/16* (2006.01)

(52) U.S. Cl.
CPC ....... *H04W 28/0278* (2013.01); *H04L 1/1607* (2013.01); *H04L 1/1896* (2013.01)

(56) References Cited

U.S. PATENT DOCUMENTS

| | | | |
|---|---|---|---|
| 2010/0202380 A1* | 8/2010 | Park | H04W 56/0005 370/329 |
| 2012/0099452 A1* | 4/2012 | Dai | H04W 72/1284 370/252 |
| 2013/0003650 A1* | 1/2013 | Han | H04B 7/155 370/315 |
| 2013/0022011 A1* | 1/2013 | Enomoto | H04L 1/0026 370/329 |
| 2013/0170463 A1* | 7/2013 | Yang | H04L 1/1861 370/329 |
| 2013/0301571 A1* | 11/2013 | Sorrentino | H04L 5/001 370/329 |
| 2015/0245344 A1* | 8/2015 | You | H04J 11/00 370/280 |
| 2016/0105905 A1* | 4/2016 | Vajapeyam | H04W 72/1263 370/330 |
| 2016/0150560 A1* | 5/2016 | Ji | H04L 1/1854 370/330 |
| 2016/0227562 A1* | 8/2016 | Huang | H04W 72/04 |

OTHER PUBLICATIONS

Ericsson et al.; "New SI Proposal: Study on Latency Reduction Techniques for LTE"; 3GPP TSG RAN Meeting #67; RP-150465; Mar. 9-12, 2015; pp. 1-7; Shanghai, China.

ZTE et al.; "CR on Power Control for HARQ-ACK Transmission on PUCCH"; 3GPP TSG-RAN WG1 Meeting #65; R1-112009; May 9-13, 2011; pp. 1-4; Barcelona, Spain.

* cited by examiner

RADIO TERMINAL, BASE STATION, AND PROCESSOR

TECHNICAL FIELD

The present application relates to a radio terminal, a base station, and a processor in a mobile communication system.

BACKGROUND ART

In 3GPP (3rd Generation Partnership Project) which is a project aiming to standardize a mobile communication system, the introduction of a latency reduction function of reducing latency in radio communication has been considered. A technology for realizing such latency reduction function may include a high-speed uplink access technology, a TTI (Transmission Time Interval) shortening technology, or the like (for example, see Non Patent Document 1).

PRIOR ART DOCUMENT

Non-Patent Document

Non Patent Document 1: 3GPP contribution "RP-150465"

SUMMARY OF THE INVENTION

A radio terminal according to one embodiment comprises a controller configured to perform a process of transmitting, to a base station, scheduling requests for requesting allocation of a first resource for transmitting uplink data, by using a second resource for transmitting uplink control information. The controller is configured to perform a process of transmitting, to the base station, among the scheduling requests, a second scheduling request different from a first scheduling request. A periodic resource is configured as the second resource for transmission of the first scheduling request. An aperiodic resource is configured as the second resource for transmission of the second scheduling request. The periodic resource is a periodically located resource. The aperiodic resource is not a periodically located resource.

In one embodiment, the controller is configured to determine a transmission subframe of the second scheduling request, depending on a reception subframe in a channel for downlink data transmission addressed to the radio terminal.

In one embodiment, the controller is configured to perform a process of transmitting, as the second scheduling request, a special HARQ ACK to which a function of the scheduling request is added.

In one embodiment, the special HARQ ACK is a HARQ ACK transmitted by using a specific antenna port.

In one embodiment, the special HARQ ACK is a HARQ ACK transmitted by using a parameter of a channel for transmission of specific uplink control information.

In one embodiment, the special HARQ ACK is a HARQ ACK representing a transmission buffer state of the radio terminal by a combination of an antenna port and a parameter of a channel for transmission of uplink control information.

In one embodiment, the controller is configured to perform a process of transmitting, to the base station, capability information indicating that the radio terminal has a function of transmitting the second scheduling request.

In one embodiment, the controller is configured to activate or deactivate the transmission of the second scheduling request, according to an instruction from the base station.

In one embodiment, the controller is configured to activate or deactivate the transmission of the second scheduling request, depending on a transmission buffer state of the radio terminal.

In one embodiment, the second scheduling request is a control signal different from a HARQ ACK, and the second resource for the transmission of the second scheduling request is designated by the base station.

In one embodiment, the controller is configured to perform a process of transmitting the second scheduling request before a TCP ACK is notified to a lower layer, based on a measurement value of a time since a packet moves from the lower layer to a higher layer of the radio terminal until the TCP ACK is notified from the higher layer to the lower layer.

A base station according to one embodiment comprises a controller configured to perform a process of receiving, from a radio terminal, scheduling requests for requesting allocation of a first resource for transmitting uplink data, by using a second resource for transmitting uplink control information. The controller is configured to perform a process of receiving, from the radio terminal, among the scheduling requests, a second scheduling request different from a first scheduling request. A periodic resource is configured as the second resource for transmission of the first scheduling request. An aperiodic resource is configured as the second resource for transmission of the second scheduling request. The periodic resource is a periodically located resource. The aperiodic resource is not a periodically located resource.

In one embodiment, the controller is configured to determine a reception subframe of the second scheduling request, depending on a transmission subframe in a channel for downlink data transmission addressed to the radio terminal.

In one embodiment, the controller is configured to perform a process of receiving, as the second scheduling request, a special HARQ ACK to which a function of the scheduling request is added.

In one embodiment, the special HARQ ACK is a HARQ ACK transmitted by using a specific antenna port.

In one embodiment, the special HARQ ACK is a HARQ ACK transmitted by using a parameter of a channel for transmission of specific uplink control information.

In one embodiment, the special HARQ ACK is a HARQ ACK representing a transmission buffer state of the radio terminal by a combination of an antenna port and a parameter of a channel for transmission of uplink control information.

In one embodiment, the controller is configured to perform a process of receiving, from the radio terminal, capability information indicating that the radio terminal has a function of transmitting the second scheduling request.

In one embodiment, the controller is configured to instruct the radio terminal to activate or deactivate the transmission of the second scheduling request.

In one embodiment, the second scheduling request is a control signal different from a HARQ ACK. The controller is configured to designate the second resource for the transmission of the second scheduling request, for the radio terminal.

In one embodiment, the controller is configured to acquire, from the radio terminal, a measurement value of a time since a packet moves from a lower layer to a higher layer of the radio terminal until the TCP ACK is notified from the higher layer to the lower layer, and, based on the measurement value, allocate the first resource to the radio terminal before receiving the scheduling request from the radio terminal.

A processor according to one embodiment controls a radio terminal. The processor is configured to perform the processes of; transmitting, to a base station, scheduling requests for requesting allocation of a first resource for transmitting uplink data, by using a second resource for transmitting uplink control information; and transmitting, to the base station, among the scheduling requests, a second scheduling request different from a first scheduling request. A periodic resource is configured as the second resource for transmission of the first scheduling request. An aperiodic resource is configured as the second resource for transmission of the second scheduling request. The periodic resource is a periodically located resource. The aperiodic resource is not a periodically located resource.

DESCRIPTION OF THE EMBODIMENT

[Overview of Embodiment]

On a PUCCH (Physical Uplink Control Channel), a radio terminal transmits, to a base station, a scheduling request (SR) for requesting a PUSCH (Physical Uplink Shared Channel) resource. The base station allocates a PUSCH resource to the radio terminal, in response to reception of the SR. Further, for transmission of the SR, a periodic PUCCH resource is configured.

Here, a method for enabling high-speed uplink access (that is, a reduction in uplink latency) is considered by configuring a short periodicity for the PUCCH resource for the SR transmission (SR periodicity). However, such a method requires to reserve a large amount of PUCCH resources for the SR transmission, and thus, a resource utilization efficiency decreases.

In the embodiment below, a technology is disclosed that allows high-speed uplink access while preventing decrease of the resource utilization efficiency.

A radio terminal according to one embodiment transmits, to a base station, scheduling requests for requesting allocation of PUSCH resource, by using a PUCCH resource. The radio terminal comprises a controller configured to perform a process of transmitting, to the base station, among the scheduling requests, a second scheduling request different from a first scheduling request. A periodic PUCCH resource is configured as the PUCCH resource for transmission of the first scheduling request. An aperiodic resource is configured as the PUCCH resource for transmission of the second scheduling request.

A base station according to one embodiment receives, from a radio terminal, scheduling requests for requesting PUSCH resources, by using PUCCH resources. The base station comprises a controller configured to perform a process of receiving, from the radio terminal, a second scheduling request different from a first scheduling request. A periodic PUCCH resource is configured as the PUCCH resource for transmission of the first scheduling request. An aperiodic PUCCH resource is configured as the PUCCH resource for transmission of the second scheduling request.

A processor according to one embodiment controls a radio terminal configured to transmit, to a base station, scheduling requests for requesting allocation of PUSCH resource, by using a PUCCH resource. The processor is configured to perform a process of transmitting, to the base station, among the scheduling requests, a second scheduling request different from a first scheduling request. periodic PUCCH resource is configured as the PUCCH resource for transmission of the first scheduling request. An aperiodic PUCCH resource is configured as the PUCCH resource for transmission of the second scheduling request.

[Mobile Communication System]

Hereinafter, an overview of an LTE system which is the mobile communication system according to the embodiments will be described below.

(1) Configuration of Mobile Communication System

Figure 1:
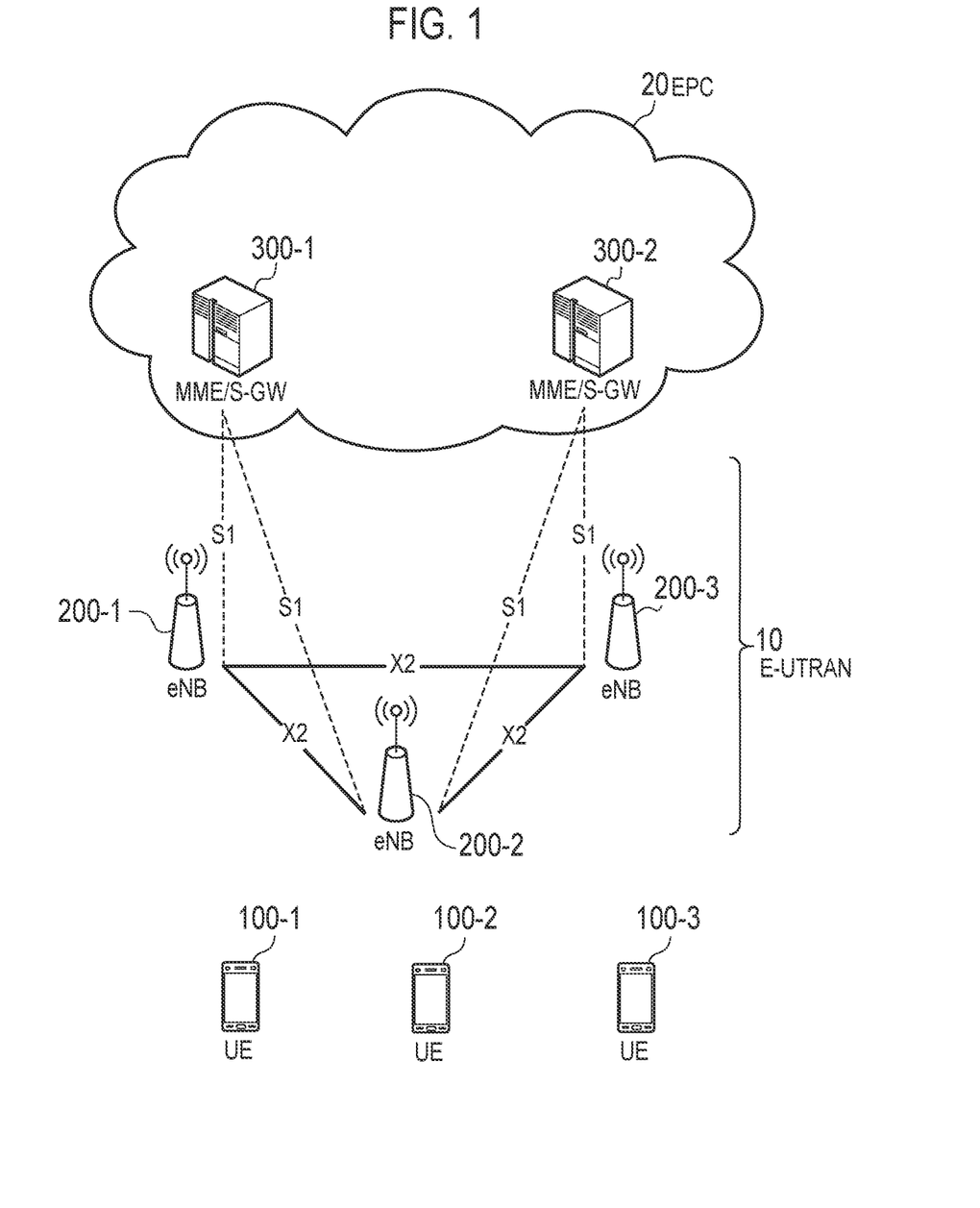
FIG. 1 is a diagram illustrating a configuration of an LTE system.

FIG. 1 is a diagram illustrating a configuration of the LTE system. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network.

(2) Configuration of Radio Interface

Figure 2:
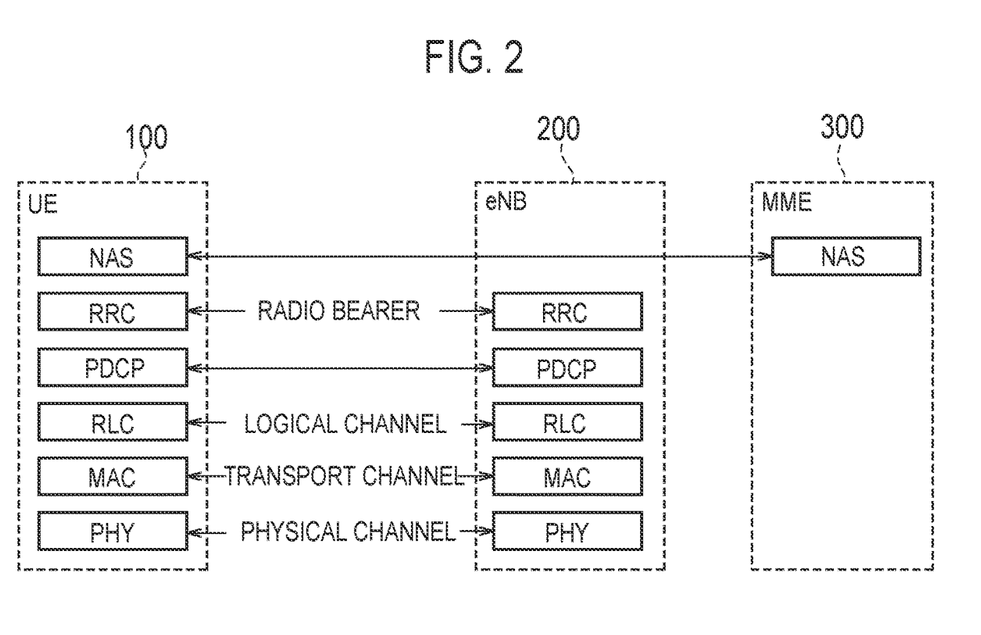
FIG. 2 is a protocol stack diagram of a radio interface in the LTE system.

FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

The UE 100 has fourth to seventh layers of the OSI reference model as the upper protocol of the radio interface protocol. The transport layer which is the fourth layer includes TCP (Transmission Control Protocol). TCP will be described later.

(3) Overview of Lower Layer of LTE

Figure 3:
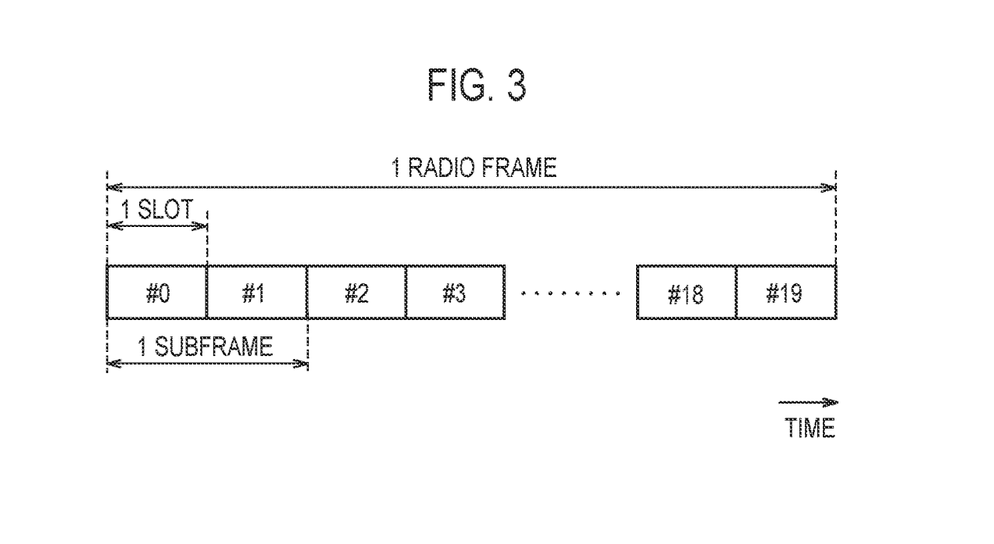
FIG. 3 is a configuration diagram of a radio frame used in the LTE system.

FIG. 3 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 3, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a control region used as a physical downlink control channel (PDCCH) for mainly transmitting a control signal. The details of the PDCCH will be described later. Furthermore, the other portion of each subframe is a region available as a physical downlink shared channel (PDSCH) for mainly transmitting downlink data. Furthermore, in each subframe, a downlink reference signal such as a cell specific reference signal (CRS) is arranged.

Basically, the eNB 200 uses the PDCCH to transmit the downlink control signal (Downlink Control Information (DCI)) to the UE 100, and uses the PDSCH to transmit downlink data to the UE 100. The downlink control signal carried by the PDCCH includes uplink SI (Scheduling Information), downlink SI, and a TPC bit. The uplink SI is scheduling information related to an allocation of an uplink radio resource (UL grant), and the downlink SI is scheduling information related to an allocation of a downlink radio resource. The TPC bit is information for indicating an increase or decrease in the uplink transmission power. In order to identify a UE 100 to which the downlink control signal is transmitted, the eNB 200 includes, into the downlink control signal, a CRC bit scrambled by an identifier (Radio Network Temporary ID (RNTI)) of the UE 100 to which the control signal is transmitted. Each UE 100 descrambles, by the RNTI of each UE, the CRC bit of the downlink control signal that may be addressed to each UE so as to perform blind decoding of the PDCCH to detect the downlink control signal addressed to each UE. The PDSCH carries the downlink data by the downlink radio resource (resource block) indicated by the downlink SI.

In the uplink, both ends in the frequency direction of each subframe are control regions used as a physical uplink control channel (PUCCH) for mainly transmitting an uplink control signal. Furthermore, the other portion of each subframe is a region available as a physical uplink shared channel (PUSCH) for mainly transmitting uplink data. Further, in the downlink, an MBSFN subframe, which is a subframe for MBSFN transmission, may be configured.

Basically, the UE 100 uses the PUCCH to transmit the uplink control signal (Uplink Control Information (UCI)) to the eNB 200, and uses the PUSCH to transmit uplink data to the eNB 200. The uplink control signal carried on the PUCCH includes a CQI (Channel Quality Indicator), a PMI (Precoding Matrix Indicator), an RI (Rank Indicator), a scheduling request (SR), and a HARQ ACK/NACK. The CQI is an index indicating a downlink channel quality and is used for deciding an MCS to be used for the downlink transmission, for example. The PMI is an index indicating a precoder matrix preferably used for the downlink transmission. The RI is an index indicating the number of layers (the number of streams) available for the downlink transmission. The SR is information for requesting allocation of the PUSCH resource. The HARQ ACK/NACK is delivery acknowledgement information indicating whether or not downlink data is correctly received.

(4) Overview of SR

As described above, the UE 100 transmits, to the eNB 200, the SR for requesting a PUSCH resource, on the PUCCH. In response to reception of the SR, the eNB 200 allocates a PUSCH resource to the UE 100 (that is, the eNB 200 transmits a "UL grant" to the UE 100).

In accordance to $N^{(1)}_{PUCCH,SRI}$, which is a PUCCH parameter configured by RRC signaling from the eNB 200, the UE 100 determines a PUCCH resource for transmission of the SR. The parameter is a parameter specific to a UE.

Further, an SR configuration including a transmission periodicity (SR periodicity) and a subframe offset (SR subframe offset) of the SR, is prescribed by an "SR configuration index" that is a parameter configured by RRC signaling from the eNB 200 to the UE 100. The parameter is a parameter specific to a UE. An example of the "SR configuration" is shown in Table 1.

TABLE 1

| SR configuration Index $I_{SR}$ | SR periodicity (ms) $SR_{PERIODICITY}$ | SR subframe offset $N_{OFFSET, SR}$ |
|---|---|---|
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |
| 155-156 | 2 | $I_{SR} - 155$ |
| 157 | 1 | $I_{SR} - 157$ |

As described, for transmission of the SR, a periodic PUCCH resource is configured. In the example of Table 1, the periodicity (SR periodicity) of the PUCCH resource for the transmission of the SR is within a range from 1 [ms] to 80 [ms].

For example, the UE 100 can transmit the SR in each subframe satisfying the following equation (1).

[Math. 1]

$$(10 \times n_f + \lfloor n_s/2 \rfloor - N_{OFFSET,SR}) \bmod SR_{PERIODICITY} = 0 \quad (1)$$

Here, "$n_f$" is a system frame number (radio frame number), "$n_s$" is a slot number in the frame (from number 0 to 19), "$N_{OFFSET,SR}$" is a subframe offset (SR subframe offset), and "$SR_{PERIODICITY}$" is an SR periodicity.

(5) Overview of HARQ

HARQ is a technique for improving the communication quality of a transmission path by combining an ARQ and error correction. Especially by combining, in retransmission, a reception result of an initial transmission with a reception result of the retransmission, an improvement in quality can be achieved.

An example of a retransmission method will be explained. If received data cannot be correctly decoded in the UE 100, that is, if a CRC (Cyclic Redundancy Check) error occurs, a "HARQ NACK" is transmitted from the UE 100 to the eNB 200. The eNB 200, which has received the "HARQ NACK", retransmits the data. On the other hand, if received data can be correctly decoded in the UE 100, that is, if no CRC error occurs, a "HARQ ACK" is transmitted from the UE 100 to the eNB 200.

One example of a HARQ scheme is chase combining. The chase combining is a scheme in which the same data is transmitted in the initial transmission and the retransmission, and in the retransmission, the data of the initial transmission and the data of the retransmission is combined to improve a gain. Further, another example of the HARQ scheme is incremental redundancy (IR). The IR is a scheme in which a redundancy increases by transmitting parity bits in the retransmission and combining an initial transmission and the retransmission, and the quality improves by an error correction function.

(6) Configuration of radio terminal

Figure 4:
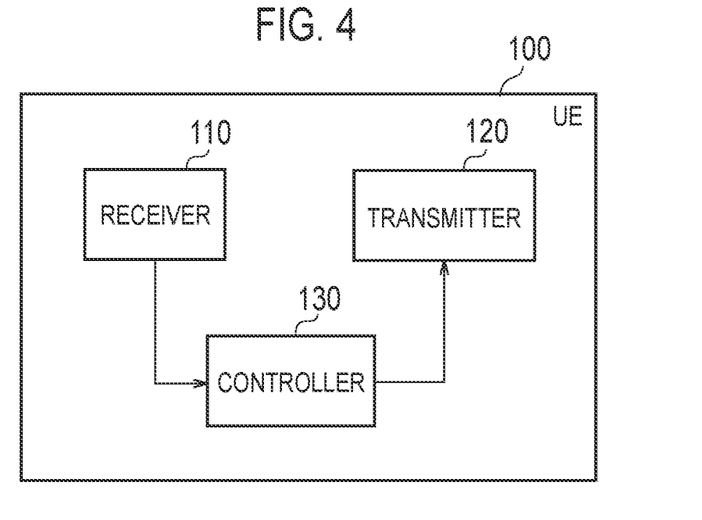
FIG. 4 is a block diagram of a UE (radio terminal).

FIG. 4 is a block diagram of the UE 100 (radio terminal). As illustrated in FIG. 4, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130.

The transmitter 120 performs various types of transmissions under the control of the controller 130. The transmitter 120 includes an antenna and a transmitter unit. The transmitter unit converts a baseband signal (transmitted signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor may include a codec that performs encoding and decoding on sound and video signals. The processor executes the above-described processes and below-described processes.

(7) Configuration of base station

Figure 5:
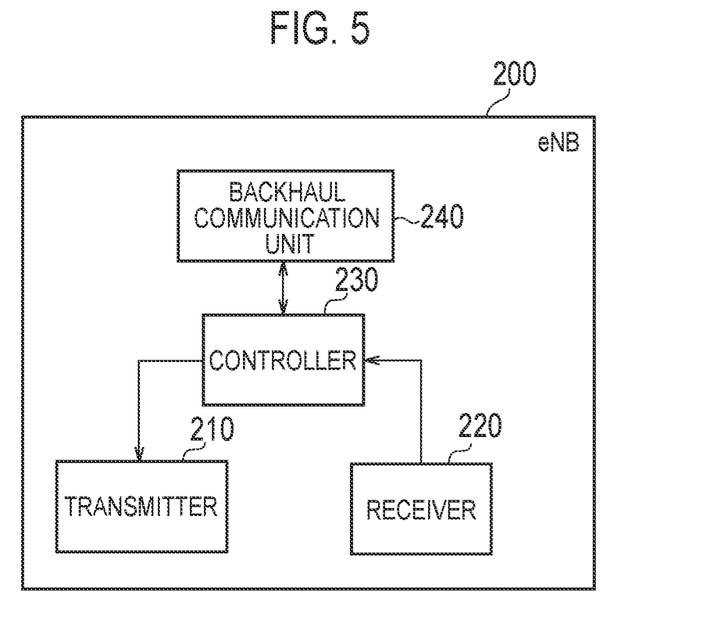
FIG. 5 is a block diagram of an eNB (base station).

FIG. 5 is a block diagram of the eNB 200 (base station). As illustrated in FIG. 5, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmitted signal) output from the controller 230 into a radio signal, and transmits the radio signal from the antenna.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230.

The controller 230 performs various types of controls in the eNB 200. The controller 230 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor executes the above-described processes and below-described processes.

The backhaul communication unit 240 is connected to a neighboring eNB 200 via the X2 interface and is connected to the MME/S-GW 300 via the S1 interface. The backhaul communication unit 240 is used for communication performed on the X2 interface, communication performed on the S1 interface, and the like.

[Overview of TCP]

Figure 6:
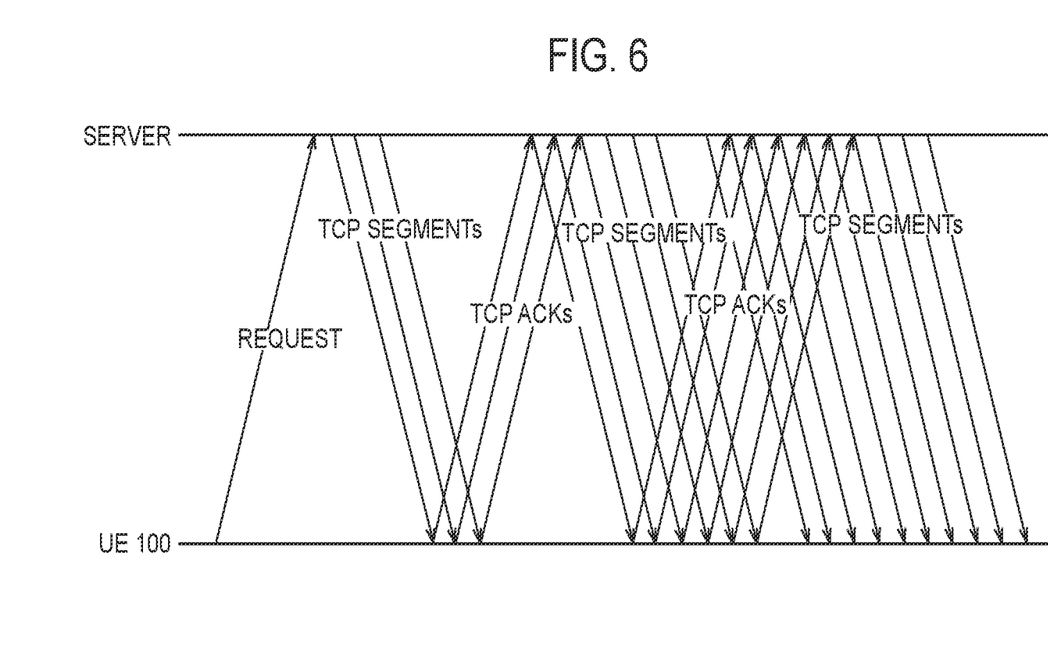
FIG. 6 is a diagram for explaining an overview of a TCP.

FIG. 6 is a diagram for explaining an overview of the TCP. In the embodiment, the UE 100 performs TCP communication, via a network of the LTE system, with a server on the Internet.

As illustrated in FIG. 6, the server determines a congestion state of the network, based on a "TCP ACK" from the UE 100. The server gradually increases a window size, in response to reception of the "TCP ACK". The window size is an amount of a "TCP Segment" continuously transmitted without waiting for the "TCP ACK". On the other hand, if failing to receive the "TCP ACK" (time-out), the server halves the window size. Such a control is called "slow start".

Thus, even if the downlink of the LTE system is not congested, unless the UE 100 quickly transmits the "TCP ACK" in the uplink, it is not possible to enhance a downlink TCP throughput. That is, if it is possible to shorten the time (uplink latency) from the generation of the "TCP ACK" in the UE 100 to the completion of the transmission of the "TCP ACK" to the eNB 200, it is possible to enhance the downlink TCP throughput. Here, for transmitting the "TCP ACK" from the UE 100 to the eNB 200, it is necessary to allocate an uplink resource (specifically, a PUSCH resource) from the eNB 200 to the UE 100.

In the embodiment below, a UE 100 and an eNB 200 allowing for high-speed uplink access in which uplink latency reduces will be described.

First Embodiment

A first embodiment will be described, below.

(1) Overview of First Embodiment

The UE 100 uses the PUCCH resource to transmit, to the eNB 200, the SR for requesting the PUSCH resource. Among the SRs, the UE 100 transmits a second SR different from a first SR. The eNB 200 receives the second SR. As a PUCCH resource for the transmission of the first SR, a periodic PUCCH resource is configured. As a PUCCH resource for the transmission of the second SR, an aperiodic PUCCH resource is configured.

A transmission subframe for the first SR is decided by the above-mentioned equation (1). The UE 100 decides the transmission subframe for the first SR by the above-mentioned equation (1).

On the other hand, for the second SR, the transmission subframe is determined depending on a reception subframe of the PDSCH addressed to the UE 100. The UE 100 decides the transmission subframe for the second SR depending on the reception subframe of the PDSCH addressed to the UE 100. The eNB 200 decides the reception subframe for the second SR depending on the transmission subframe of the PDSCH addressed to the UE 100.

In the first embodiment, the UE 100 transmits, as the second SR, a special HARQ ACK to which a function of the SR is added. In FDD, for example, it is prescribed that the UE 100 transmits the HARQ ACK to the eNB 200 in the fourth subframe after a subframe in which the PDSCH is received. Thus, the UE 100 transmits, to the eNB 200, a special HARQ ACK to which a function of the SR is added, in the fourth subframe after the subframe in which the PDSCH is received. The eNB 200 receives, as the second SR, the special HARQ ACK to which a function of the SR is added.

As described above, high-speed uplink access may be enabled without configuring a short periodicity for the PUCCH resource for the SR transmission (SR periodicity). Therefore, high-speed uplink access may be enabled while preventing a decrease of the resource utilization efficiency.

(2) Pattern 1

In pattern 1, the special HARQ ACK is a HARQ ACK transmitted by using a specific antenna port.

Figure 7:
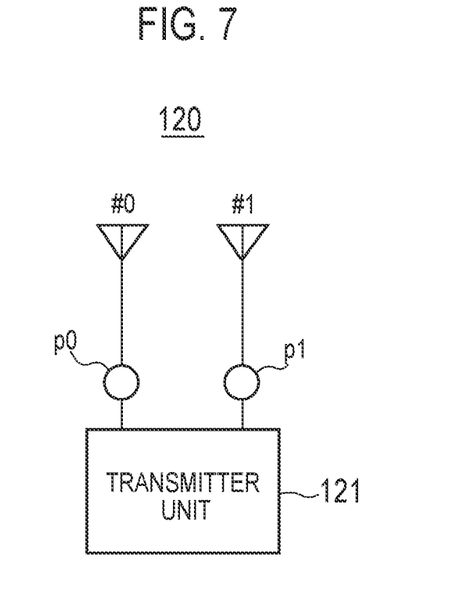
FIG. 7 is a diagram illustrating a transmitter of the UE according to a first embodiment.

FIG. 7 is a diagram illustrating one example of the transmitter 120 of the UE 100 according to the first embodiment. This transmitter may only be applied in patterns 1 and 3.

As illustrated in FIG. 7, in the transmitter 120, antennas #0 and #1 are connected to a transmitter unit 121 via antenna ports p0 and p1. That is, the transmitter 120 can perform two-antenna port-transmission. Normally, the two-antenna port-transmission is used for uplink MIMO and the like. The antenna ports p0 and p1 transmit different reference signals, and thus, the eNB 200 can identify, based on the reference signal, an antenna port from which a signal is transmitted.

The controller 130 of the UE 100 determines an antenna port to be used for transmitting the HARQ ACK, depending on whether or not the HARQ ACK to be transmitted to the eNB 200 is a special HARQ ACK.

For example, a HARQ ACK transmitted only by the antenna port p0 is a normal HARQ ACK. A HARQ ACK transmitted only by the antenna port p1 or by both antenna ports p0 and p1, is a special HARQ ACK. Such a correspondence relationship may be prescribed by a specification of the LTE system. Alternatively, such a correspondence relationship may be designated by RRC signaling or the like from the eNB 200 to the UE 100.

The receiver 220 of the eNB 200 receives the HARQ ACK transmitted from the UE 100. Based on the above-mentioned correspondence relationship, the controller 230 of the eNB 200 determines whether or not the HARQ ACK transmitted from the UE 100 is a special HARQ ACK. Upon determination that the special HARQ ACK was received, the controller 230 of the eNB 200 allocates the PUSCH resource to the UE 100 (that is, a "UL grant" is transmitted to the UE 100).

(3) Pattern 2

In pattern 2, the special HARQ ACK is a HARQ ACK transmitted by using a specific PUCCH parameter.

In accordance with $N^{(1)}_{PUCCH}$, which is a PUCCH parameter configured by RRC signaling from the eNB 200, the UE 100 determines a PUCCH resource for transmission of the HARQ ACK.

In FDD, for example, the UE 100 determines the PUCCH resource for transmission of the HARQ ACK by the following equation (2).

$$n_{PUCCH}^{(1)} = n_{CCE} + N_{PUCCH}^{(1)} \qquad (2)$$

Here, "$n_{CCE}$" is a number of a first CCE (control channel element) used for transmission of a corresponding downlink allocation (DCI).

Thus, by introducing, in addition to the $N^{(1)}_{PUCCH}$ for the normal HARQ ACK, the $N^{(1)}_{PUCCH}$ for the special HARQ ACK (specific PUCCH parameter), it is possible to identify whether or not a HARQ ACK is the special HARQ ACK.

The controller 130 of the UE 100 determines the $N^{(1)}_{PUCCH}$ to be used for transmitting the HARQ ACK depending on whether or not the HARQ ACK to be transmitted to the eNB 200 is a special HARQ ACK.

The receiver 220 of the eNB 200 receives the HARQ ACK transmitted from the UE 100. The controller 230 of the eNB 200 determines whether or not the HARQ ACK transmitted from the UE 100 is a special HARQ ACK, based on which $N^{(1)}_{PUCCH}$ was used for transmitting the HARQ ACK. Upon determination that the special HARQ ACK was received, the controller 230 of the eNB 200 allocates the PUSCH resource to the UE 100.

(4) Pattern 3

In pattern 3, the special HARQ ACK is a HARQ ACK which represents a transmission buffer state of the UE 100 by combining the antenna port and the PUCCH parameter ($N^{(1)}_{PUCCH}$). The transmission buffer state of the UE 100 is represented by, for example, the number of "TCP ACKs" awaiting transmission in the UE 100.

Two types of HARQ ACK can be identified by pattern 1, and two types of HARQ ACK can be identified by pattern 2. Thus, by combining pattern 1 and 2, a total of four types of HARQ ACK can be identified. An example of a correspondence relationship between the combination of the antenna port and the PUCCH parameter ($N^{(1)}_{PUCCH}$), and the transmission buffer state of the UE 100 is given in Table 2.

TABLE 2

| | |
|---|---|
| p0 + $N^{(1)}_{PUCCH}$ | Ack without SR |
| p0 + new $N^{(1)}_{PUCCH}$ | Ack with SR for one TCP Ack |
| p1 + $N^{(1)}_{PUCCH}$ | Ack with SR for two TCP Acks |
| p1 + new $N^{(1)}_{PUCCH}$ | Ack with SR for three TCP Acks |

Here, "p0" indicates the antenna port p0, "p1" indicates the antenna port p1, "$N^{(1)}_{PUCCH}$" indicates a normal $N^{(1)}_{PUCCH}$, and "new $N^{(1)}_{PUCCH}$" indicates a newly introduced $N^{(1)}_{PUCCH}$.

In the example in Table 2, a HARQ ACK transmitted by using the antenna port p0 and the normal $N^{(1)}_{PUCCH}$, is a normal HARQ ACK (that is, a HARQ ACK to which no SR function is added).

A HARQ ACK transmitted by using the antenna port p0 and the newly introduced $N^{(1)}_{PUCCH}$ is a special HARQ ACK indicating a buffer state corresponding to one TCP ACK.

A HARQ ACK transmitted by using the antenna port p1 and the normal $N^{(1)}_{PUCCH}$ is a special HARQ ACK indicating a buffer state corresponding to two TCP ACKs.

A HARQ ACK transmitted by using the antenna port p1 and the newly introduced $N^{(1)}_{PUCCH}$ is a special HARQ ACK indicating a buffer state corresponding to three TCP ACKs.

Such a correspondence relationship may be prescribed by a specification of the LTE system. Alternatively, such a correspondence relationship may be designated by RRC signaling or the like from the eNB 200 to the UE 100. Further, information (right column in Table 2) for a combination of the antenna port and the $N^{(1)}_{PUCCH}$ (left column in Table 2) is not limited to the examples in Table 2. For example, a concrete buffer amount of "X bytes" may be associated with the combination of the antenna port and the $N^{(1)}_{PUCCH}$. Information associated with the combination of the antenna port and the $N^{(1)}_{PUCCH}$ is prescribed by the specification of the LTE system, or is designated by RRC signaling or the like from the eNB 200 to the UE 100.

The controller 130 of the UE 100 determines the antenna port and the $N^{(1)}_{PUCCH}$ to be used for transmitting the HARQ ACK, depending on whether or not the HARQ ACK to be transmitted to the eNB 200 is a special HARQ ACK, and on the buffer state.

The receiver 220 of the eNB 200 receives the HARQ ACK transmitted from the UE 100. Based on which antenna port and $N^{(1)}_{PUCCH}$ were used for transmitting the HARQ ACK, the controller 230 of the eNB 200 determines the buffer state of the UE 100 and whether or not the HARQ ACK transmitted from the UE 100 is a special HARQ ACK. Upon determination that the special HARQ ACK was received, the controller 230 of the eNB 200 allocates the PUSCH resource depending on the buffer state of the UE 100.

In pattern 3, it is possible to notify a more detailed transmission buffer state to the eNB 200 by increasing the antenna port number of the UE 100 or by increasing the types of "HARQ ACK PUCCH parameters".

(5) Operation example according to first embodiment

Figure 8:
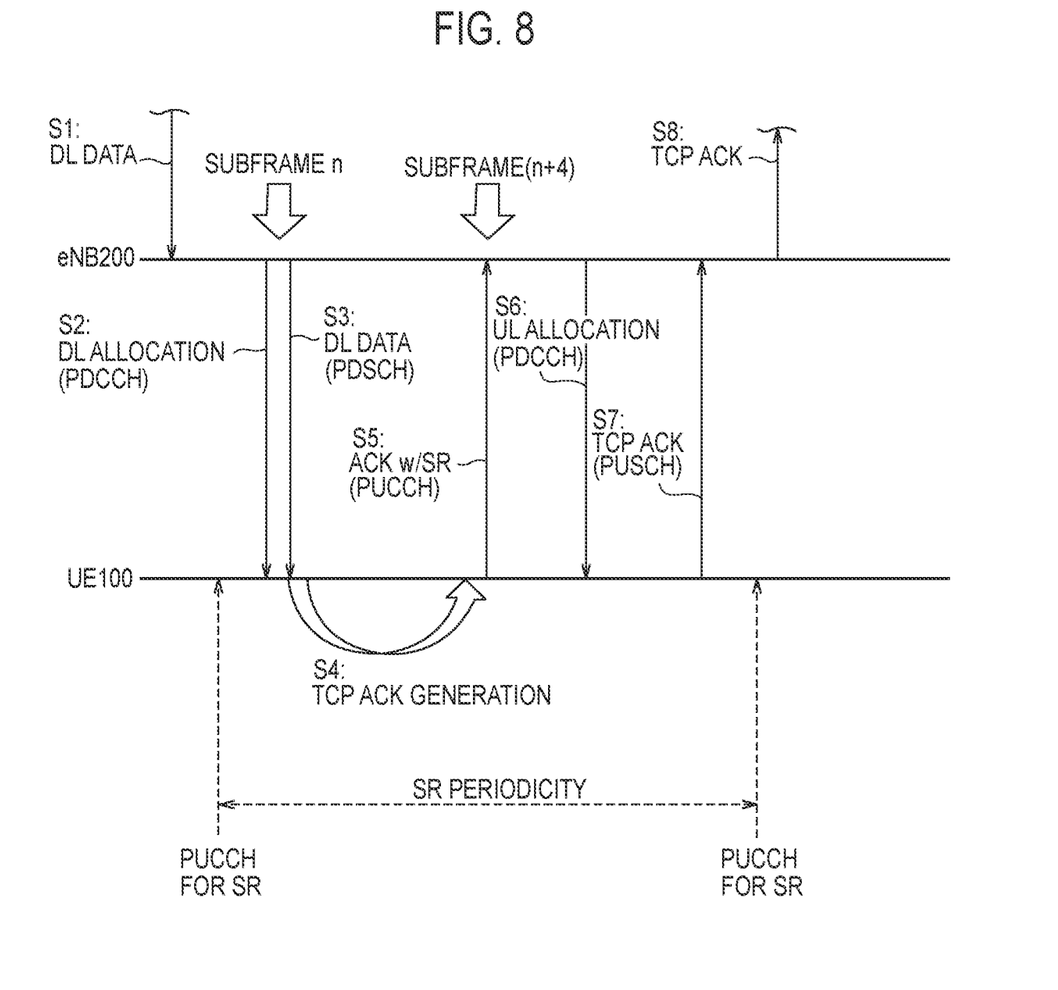
FIG. 8 is a diagram illustrating an operation example according to the first embodiment.

FIG. 8 is a diagram illustrating an operation example according to the first embodiment. The present operation example is mostly executed by an LTE lower layer. The LTE lower layer includes an LTE physical layer. The LTE lower layer may include an LTE MAC layer. It is noted that in FIG. 8, the "PUCCH for SR" indicates a PUCCH resource periodically configured in accordance with the "SR periodicity" (such as 10 [ms], or 20 [ms]).

As illustrated in FIG. 8, in response to reception of DL data from the core network side (step S1), the eNB 200 uses a PDCCH of subframe n to allocate a PDSCH resource to the UE 100 (step S2). Specifically, the eNB 200 transmits, on the PDCCH, the DCI including the downlink SI, to the UE 100. The eNB 200 uses the PDSCH of subframe n to transmit the DL data to the UE 100 (step S3).

The UE 100 normally receives the DL data and moves the DL data to a higher layer of the UE 100. The higher layer of the UE 100 generates a TCP ACK to be notified to a lower layer of the UE 100 (step S4). The UE 100 decides to request allocation of the PUSCH resource to the eNB 200, in response to the presence of data (the TCP ACK) in the transmission buffer (lower layer of the UE 100).

The UE 100 uses a PUCCH (that is, a PUCCH resource for the transmission of the HARQ ACK) of subframe (n+4) to transmit the special HARQ ACK (ACK w/SR) to the eNB 200 (step S5).

In response to reception of the "ACK w/SR", the eNB 200 uses the PDCCH to allocate the PUSCH resource to the UE 100 (step S6). Specifically, the eNB 200 transmits, on the PDCCH, the DCI including a "Scheduling grant", to the UE 100.

The UE 100 uses the PUSCH resource allocated from the eNB 200 to transmit to the eNB 200 the data (the TCP ACK) in the transmission buffer (step S7).

The eNB 200 transmits the data (the TCP ACK) received from the UE 100 to the core network side (step S8).

Here, in the example of FIG. 8, a comparative example is assumed in which the SR is transmitted by using only the PUCCH resource periodically configured in accordance with the "SR periodicity". In this case, after generation of the TCP ACK (step S4), a long time period is required until the SR can be transmitted.

Therefore, the allocation of the PUSCH resource to the UE 100 is delayed, and a timing when the UE 100 transmits the TCP ACK is delayed. Thus, as a result of uplink latency, it is difficult to increase downlink TCP throughput.

[First Modification of First Embodiment]

Figure 9:
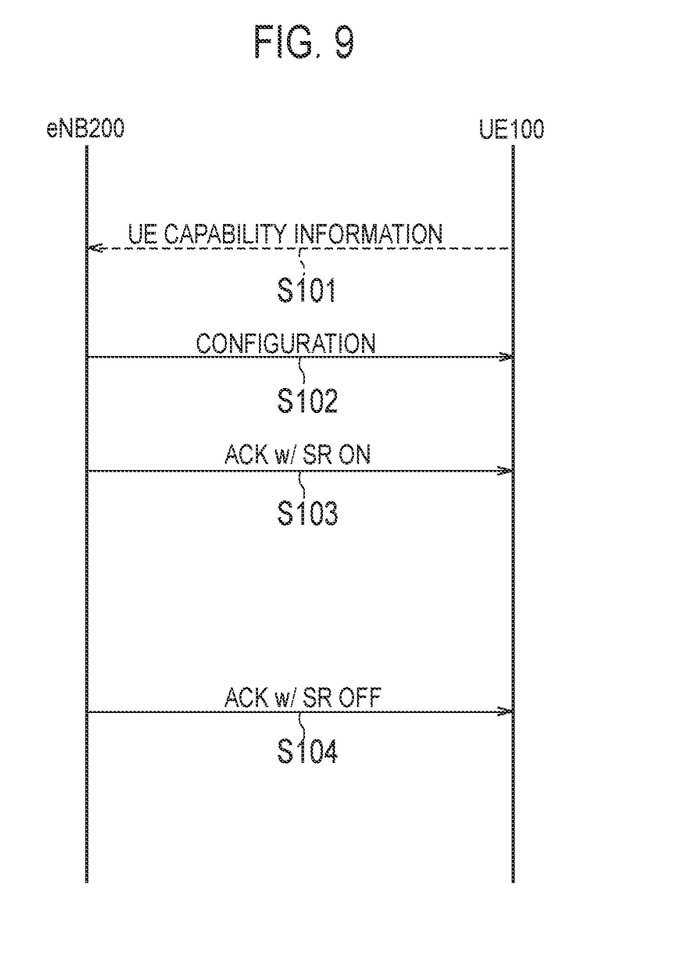
FIG. 9 is a diagram illustrating an operation according to a first modification of the first embodiment.

The present modification relates to a method for appropriately controlling an operation according to the first embodiment. FIG. 9 is a diagram illustrating an operation according to the present modification. In an initial state in FIG. 9, the UE 100 is in the RRC connected mode in the cell of the eNB 200.

As illustrated in FIG. 9, the UE 100 transmits, to the eNB 200, capability information (UE Capability Information) indicating that the UE 100 has a function of transmitting the second SR (step S101). The eNB 200 receives the "UE Capability Information". However, the eNB 200 may acquire the "UE Capability Information" from the MME 300, without receiving the "UE Capability Information" from the UE 100. Based on the "UE Capability Information", the eNB 200 acknowledges that the UE 100 has the function of transmitting the second SR.

Alternatively, the UE 100 may transmit, to the eNB 200, an interest notification indicating that the UE 100 has an interest in high-speed uplink access. The interest notification can be regarded as a configuration request for requesting configuration related to the high-speed uplink access (that is, configuration of the second SR). The interest notification may be transmitted from the UE 100 to the eNB 200 by "UE Assistance Information" that is one type of an RRC message. It is noted that the UE 100 may transmit, to the eNB 200, either only one or both of the "UE Capability Information" and the interest notification (UE Assistance Information). Thus, the eNB 200 may acknowledge that the UE 100 has the function of transmitting the second SR.

The eNB 200 transmits, to the UE 100, configuration information (Configurations) including the above-mentioned, various types of parameters (step S102). The various types of parameters include a parameter relating to the configuration of the second SR. The UE 100 stores the Configurations (the various types of parameters). The eNB 200 and the UE 100 start transmission and reception of data. At this point, the transmission of the second SR is in an inactive (deactive) state.

The eNB 200 transmits, to the UE 100, an instruction (ACK w/SR ON) for activating the transmission of the second SR (step S103). The "ACK w/SR ON" may be identified by a new DCI format. That is, the UE 100 interprets DCI to which the new DCI format is applied, as the "ACK w/SR ON". Alternatively, the "ACK w/SR ON" may be a flag included in a bit field in the DCI. The UE 100 activates the transmission of the second SR, in response to the reception of the "ACK w/SR ON".

Thereafter, the eNB 200 transmits, to the UE 100, an instruction (ACK w/SR OFF) for deactivating the transmission of the second SR (step S104). The "ACK w/SR OFF" may be identified by a new DCI format. That is, after activating the transmission of the second SR, the UE 100 interprets, upon receiving DCI to which the new DCI format is applied, the DCI as the "ACK w/SR OFF". Alternatively, the "ACK w/SR OFF" may be a flag included in a bit field in the DCI. The UE 100 deactivates the transmission of the second SR, in response to the reception of the "ACK w/SR OFF". Thereafter, the UE 100 may retain the parameter relating to the configuration of the second SR.

[Second Modification of First Embodiment]

In the above-described first modification of the first embodiment, the UE 100 activates or deactivates the transmission of the second SR, according to the instruction from the eNB 200.

On the other hand, in the present modification, the UE 100 activates or deactivates the transmission of the second SR, depending on the transmission buffer state of the UE 100.

For example, similarly to the transmission trigger of a buffer state report (BSR), an increase of buffer amount may be a trigger for the UE 100 to activate the transmission of the second SR.

Alternatively, the UE 100 may activate the transmission of the second SR when a change occurs from a state in which originally no data is present in the transmission buffer of the UE 100, to a state in which some data is generated. On the other hand, if data is originally present in the transmission buffer and allocation of the PUSCH is performed from the eNB 200 without transmitting the SR, the UE 100 may deactivate the transmission of the second SR, as there is no need to transmit the second SR.

[Second Embodiment]

A second embodiment will be described while focusing on differences from the first embodiment, below.

In the second embodiment, the second SR is a control signal (Aperiodic SR) different from the HARQ ACK. The "Aperiodic SR" may be transmitted in a subframe different from the transmission subframe of the HARQ ACK. The eNB 200 designates, for the UE 100, a resource for the transmission of the "Aperiodic SR".

Figure 10:
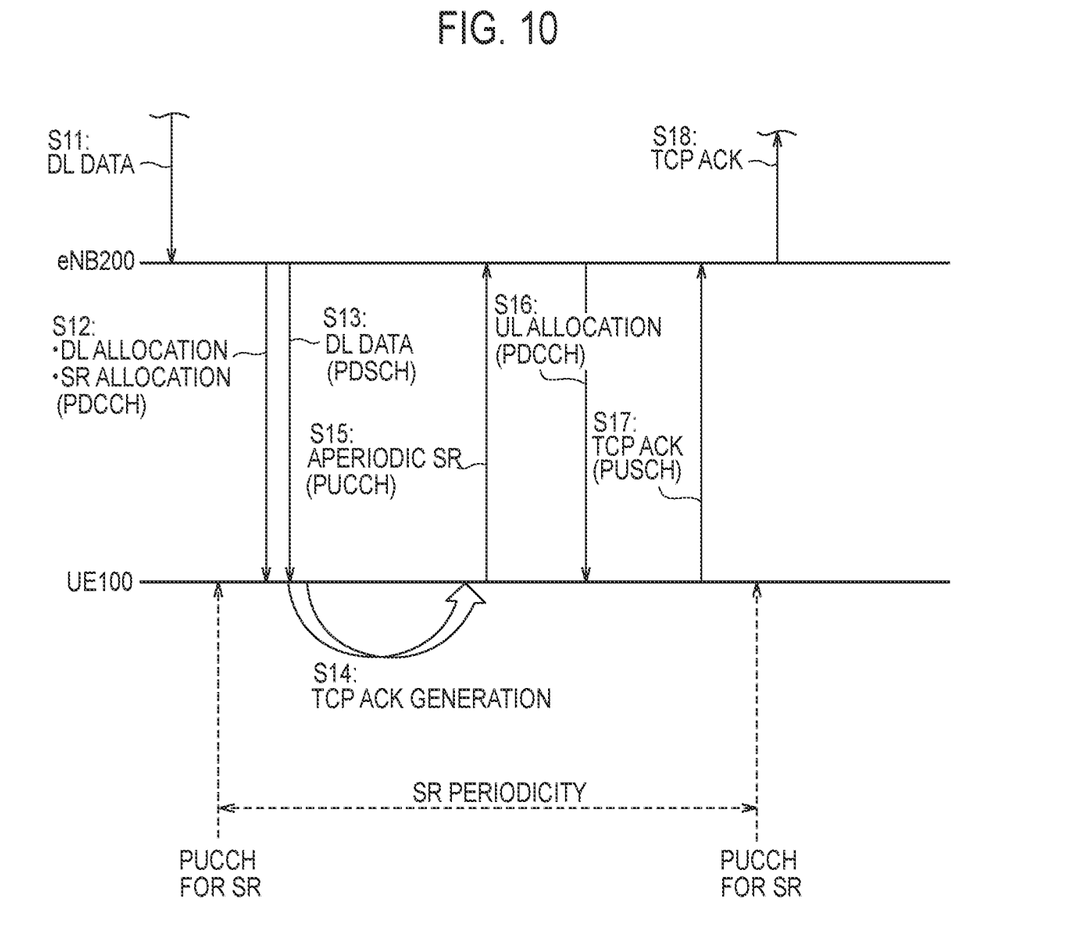
FIG. 10 is a diagram illustrating an operation example according to the second embodiment.

FIG. 10 is a diagram illustrating an operation example according to the second embodiment. Here, differences from the operation example according to the first embodiment (see FIG. 8) will be mainly described.

As illustrated in FIG. 10, in response to reception of DL data from the core network side (step S11), the eNB 200 uses a PDCCH of subframe n to allocate a PDSCH resource to the UE 100 (step S12).

In the second embodiment, the eNB 200 includes the resource for the transmission of the second SR into the DCI. The resource for the transmission of the second SR is, for example, the newly introduced $N^{(1)}_{PUCCH}$ (see first embodiment). Alternatively, similarly to the modification of the first embodiment, the resource for the transmission of the second SR (parameter relating to the second SR) may be configured to the UE 100 in advance by RRC signaling and only ON/OFF may be instructed by the DCI.

The eNB 200 uses the PDSCH of subframe n to transmit the DL data to the UE 100 (step S13).

The UE 100 normally receives the DL data and moves the DL data to a higher layer of the UE 100. The higher layer of the UE 100 generates the TCP ACK and notifies the TCP ACK to the lower layer of the UE 100 (step S14). The UE 100 decides to request allocation of the PUSCH resource to the eNB 200, in response to the presence of data (the TCP ACK) in the transmission buffer (lower layer of the UE 100).

The UE 100 transmits the second SR (Aperiodic SR) to the eNB 200 by using the PUCCH resource designated from the eNB 200 (step S15).

In response to reception of the "Aperiodic SR", the eNB 200 uses the PDCCH to allocate the PUSCH resource to the UE 100 (step S16).

The UE 100 uses the PUSCH resource allocated from the eNB 200 to transmit to the eNB 200 the data (the TCP ACK) in the transmission buffer (step S17).

The eNB 200 transmits, to the core network side, the data (the TCP ACK) received from the UE 100 (step S18).

Third Embodiment

A third embodiment will be described while focusing on the differences from the first embodiment and the second embodiment, below.

By predicting a timing of generating the TCP ACK, the UE 100 may transmit the second SR before the TCP ACK is notified from the higher layer of the UE 100 to the lower layer of the UE 100. For example, the UE 100 measures the time since a packet (for example, a PDCP packet) moved from the lower layer of the UE 100 to the higher layer of the UE 100 (including a transport layer) until the TCP ACK is notified from the higher layer of the UE 100 to the lower layer of the UE 100. Based on such a measurement value, the UE 100 can predict the timing of generating the TCP ACK. The UE 100 may perform the prediction, based on a statistical value (for example, the minimum value) of the measurement value.

The eNB 200 may receive, form the UE 100, the measurement value (or the statistical value) obtained in the UE 100. For example, in a connection sequence with the UE 100, the eNB 200 receives the measurement value (or the statistical value) from the UE 100. Alternatively, when communicating with the UE 100, the eNB 200 may receive the measurement value (or the statistical value) by a MAC control element (MCE) and the like from the UE 100. Furthermore, the eNB 200 may predict the SR transmission timing of the UE 100, based on the measurement value (or the statistical value), and may allocate the PUSCH resource to the UE 100 before receiving the SR.

Further, the eNB 200 may receive, from the UE 100, information relating to an operating condition of the UE 100, may predict the transmission timing of the SR (the first SR or the second SR) of the UE 100, based on the information, and may allocate the PUSCH resource to the UE 100 before receiving the SR. The information relating to the operating condition of the UE 100 includes, for example, terminal information of the communication (whether or not the communication terminates in the UE 100) such as a load state of a memory/CPU, and whether or not tethering is performed.

Furthermore, during a certain period after the first DL transmission to the UE 100, the eNB 200 may predict the transmission of the TCP ACK (SR transmission timing) from the UE 100 and may allocate the PUSCH resource to the UE 100 before receiving the SR. During the certain period, the eNB 200 monitors a utilization condition of the PUSCH resource and if the PUSCH resource is not utilized, the eNB 200 may stop such a preceding allocation of the PUSCH resource and may change to allocating the PUSCH resource on the basis of the SR reception.

As described above, in accordance with the third embodiment, at a timing when data (the TCP ACK) is generated, the UE 100 can immediately deliver the data (the TCP ACK) to the eNB 200.

[Other Embodiments]

In the above-described embodiments, the LTE system is exemplified as the mobile communication system. However, the present application is not limited to the LTE system. The present application may be applied to systems other than the LTE system.

[Cross Reference]

The entire content of Japanese Patent Application No. 2015-090516 (filed on Apr. 27, 2015) is incorporated in the present specification by reference.

The invention claimed is:

1. A radio terminal comprising:
a controller configured to perform a process of transmitting, to a base station, scheduling requests for requesting allocation of a first resource for transmitting uplink data, by using a second resource for transmitting uplink control information, wherein
the controller is further configured to perform a process of transmitting, to the base station, among the scheduling requests, a second scheduling request different from a first scheduling request,
a periodic resource is configured as the second resource for transmission of the first scheduling request,
an aperiodic resource is configured as the second resource for transmission of the second scheduling request,
the periodic resource is a periodically located resource,
the aperiodic resource is not a periodically located resource,
the controller is further configured to perform a process of transmitting, as the second scheduling request, a special HARQ ACK to which a function of the scheduling request is added, and
the controller is further configured to
determine a transmission buffer state which is a data amount to be transmitted by the radio terminal to the base station;
select a combination of an antenna port and a parameter of a channel for transmission of uplink control information, based on the determined transmission buffer state; and
use the selected combination to transmit the special HARQ ACK representing the transmission buffer state.

2. The radio terminal according to claim 1, wherein the controller is configured to determine a transmission subframe of the second scheduling request, depending on a reception subframe in a channel for downlink data transmission addressed to the radio terminal.

3. The radio terminal according to claim 1, wherein
the controller is configured to perform a process of transmitting, to the base station, capability information indicating that the radio terminal has a function of transmitting the second scheduling request.

4. The radio terminal according to claim 1, wherein
the controller is configured to activate or deactivate the transmission of the second scheduling request, according to an instruction from the base station.

5. The radio terminal according to claim 1, wherein the controller is configured to activate or deactivate the transmission of the second scheduling request, depending on a transmission buffer state of the radio terminal.

6. The radio terminal according to claim 1, wherein
the controller is configured to perform a process of transmitting the second scheduling request before a TCP ACK is notified to a lower layer, based on a measurement value of a time since a packet moves from the lower layer to a higher layer of the radio terminal until the TCP ACK is notified from the higher layer to the lower layer.

7. A base station comprising:
a controller configured to perform a process of receiving, from a radio terminal, scheduling requests for requesting allocation of a first resource for transmitting uplink data, by using a second resource for transmitting uplink control information, wherein
the controller is further configured to perform a process of receiving, from the radio terminal, among the scheduling requests, a second scheduling request different from a first scheduling request,
a periodic resource is configured as the second resource for transmission of the first scheduling request,
an aperiodic resource is configured as the second resource for transmission of the second scheduling request,
the periodic resource is a periodically located resource,
the aperiodic resource is not a periodically located resource,
the controller is further configured to perform a process of receiving, as the second scheduling request, a special HARQ ACK to which a function of the scheduling request is added,
the special HARQ ACK is transmitted by the radio terminal to the base station, by a combination of an antenna port and a parameter of a channel for transmission of uplink control information, in order to represent a transmission buffer state by the special HARQ ACK, the transmission buffer state is a data amount to be transmitted by the radio terminal to the base station,
the combination of the antenna port and the parameter is selected by the radio terminal based on the transmission buffer state, and
the transmission buffer state is determined by the radio terminal.

8. The base station according to claim 7, wherein
the controller is configured to determine a reception subframe of the second scheduling request, depending on a transmission subframe in a channel for downlink data transmission addressed to the radio terminal.

9. The base station according to claim 7, wherein
the controller is configured to perform a process of receiving, from the radio terminal, capability information indicating that the radio terminal has a function of transmitting the second scheduling request.

10. The base station according to claim 7, wherein the controller is configured to instruct the radio terminal to activate or deactivate the transmission of the second scheduling request.

11. The base station according to claim 7, wherein the controller is configured to acquire, from the radio terminal, a measurement value of a time since a packet moves from a lower layer to a higher layer of the radio terminal until the TCP ACK is notified from the higher layer to the lower layer, and, based on the measurement value, allocate the first resource to the radio terminal before receiving the scheduling requests from the radio terminal.

12. A processor configured to control a radio terminal, the processor comprising circuitry communicatively coupled to a memory, wherein the memory includes instructions such that when executed by the processor, causes the processor to perform processes of:

transmitting, to a base station, scheduling requests for requesting allocation of a first resource for transmitting uplink data, by using a second resource for transmitting uplink control information;

transmitting, to the base station, among the scheduling requests, a second scheduling request different from a first scheduling request, wherein a periodic resource is configured as the second resource for transmission of the first scheduling request, an aperiodic resource is configured as the second resource for transmission of the second scheduling request, the periodic resource is a periodically located resource, and the aperiodic resource is not a periodically located resource, transmitting, to the base station, as the second scheduling request, a special HARQ ACK to which a function of the scheduling request is added;

determining a transmission buffer state which is a data amount to be transmitted by the radio terminal to the base station;

selecting a combination of an antenna port and a parameter of a channel for transmission of uplink control information, based on the determined transmission buffer state; and using the selected combination to transmit the special HARQ ACK representing the transmission buffer state.

* * * * *